United States Patent [19]

Torres

[11] Patent Number: 4,685,078
[45] Date of Patent: Aug. 4, 1987

[54] DUAL INCREMENTOR

[75] Inventor: Abraham Torres, Austin, Tex.

[73] Assignee: International Business Machines Corporation, Armonk, N.Y.

[21] Appl. No.: 666,703

[22] Filed: Oct. 31, 1984

[51] Int. Cl.⁴ .............................................. G06F 7/50
[52] U.S. Cl. ................................................. 364/770
[58] Field of Search ................................ 364/770, 788

[56] References Cited

U.S. PATENT DOCUMENTS

| | | | |
|---|---|---|---|
| 3,100,836 | 8/1963 | Paul et al. | 364/788 |
| 3,299,260 | 1/1967 | Cohen | 364/783 |
| 3,440,412 | 4/1969 | Kardash | 364/786 |
| 3,465,133 | 9/1969 | Booher | 364/786 |
| 3,488,481 | 1/1970 | Franck | 364/786 |
| 3,511,978 | 5/1970 | Margulius | 364/786 |
| 3,993,891 | 11/1976 | Beck et al. | 364/786 |
| 4,052,604 | 10/1977 | Maitland et al. | 364/786 |
| 4,203,157 | 5/1980 | Daniels et al. | 364/788 |
| 4,417,315 | 11/1983 | Russell | 364/770 |
| 4,525,797 | 6/1985 | Holden | 364/788 |

OTHER PUBLICATIONS

Elliott, "Increment-Decrement Logic" *IBM Tech. Disclosure Bulletin* vol. 11 No. 3 Aug. 1968 pp. 297-298.
*Digital System Implementation*, by Gerrit A. Blaauw, published in 1976, pp. 45-51.
*Digital Systems: Hardware Organization and Design*, by F. J. Hill and G. R. Peterson, pp. 336-344.

*Primary Examiner*—David H. Malzahn
*Attorney, Agent, or Firm*—J. F. Villella, Jr.; H. Saint Julian

[57] ABSTRACT

A "lookback" carry function is implemented in a binary incrementor. In contrast to conventional lookahead carry functions, the present "lookback" carry function implements an actual carry during the incrementing operation. After the carry function has been implemented at each register position, a subsequent determination is made as to whether each carry function was a valid one and should have been carried out. With respect to any carry functions which were not valid, subsequent circuitry will eliminate such carries to leave the appropriate carry pattern in each position of the register. In order for a carry to be considered valid, the incrementation of all bits of a lower order must have resulted in a carryout.

6 Claims, 4 Drawing Figures

DUAL INCREMENTOR

DESCRIPTION

1. Technical Field

This invention relates to a carry function implemented in an incrementor for generating multiple addresses from a single current address.

2. Background Art

In a digital computer, it is often necessary to generate one or more addresses from a current address by incrementing the current address. Typically such operations require logic circuitry. When incrementing binary numbers, such as addresses, a carry bit or bits increments a current address to produce a sum or next address.

As is well known, most binary incrementors use either a ripple carry or a lookahead carry. In a ripple carry, bits are added one at a time with the carry output rippling through a parallel binary number, such as an address, until the entire number is added. As a consequence of this rippling operation, incrementors using a ripple carry can be quite time consuming.

In order to overcome the time consuming disadvantage of a ripple carry, a technique known as a lookahead carry has been employed. Using such a lookahead technique, all carry information from each stage is independent of the carry information which is supplied to that stage. As a result, all carry information in an incrementor is simultaneously applied to each stage in the incrementor. The application of carry data in this manner eliminates the propagation of carry information from stage to stage thereby increasing the operational speed of the incrementor. A significant drawback, however, in a lookahead carry approach is that complex logic design is required. This complexity of design becomes more acute at each succeeding stage in an incrementor. Examples of various lookahead carry techniques are found in U.S. Pats. Nos. 3,511,978, 3,465,133, 3,299,260, and 3,440,412.

Attempts have been made at reducing the logic required in providing a lookahead type carry function. Unfortunately, the reduction in logic has brought with it an accompanying loss of speed. One such example is shown in U.S. Pat. No. 3,488,481 wherein binary addition takes place in three steps. In the first step, corresponding bits are added without regard to carries between intergroups. In the second step, carries that were generated in the first step are propagated on so as to obtain the final sum. Finally, the third step, a determination is made as to whether or not the resulting sum is correct.

Attempts have also been made to increase speed, albeit at the expense of more logic., For example, U.S. Pat. No. 4,052,604 discloses a binary adder wherein separate logic circuitry within each digit of the adder determines the status of the output carry based on the status of corresponding digits of the numbers being added and the carry bit signal from the preceding less significant digit of the adder. In this manner, the status of the output carry bit is determined prior to completion of the sum of the corresponding digits of the numbers being added. Consequently, the addition of the more significant digits need not wait until the completion of the summation of the less significant digits.

Another approach to increase speed using the lookahead carry approach is the group carry prediction technique. With this approach, two sum terms are created. In one of these sum terms, a carry of 0 is assumed while in the other sum term, a carry of 1 is assumed. The correct sum is then determined based on the group carry terms that are generated by additional logic circuitry. While increasing the speed of the carry function, this approach greatly increases the amount of logic circuitry required. This approach has been described in *Digital Systems: Hardware Organization and Design*, pages 336–344 by Hill and Peterson, and *Digital System Implementation*, pages 45–51 by Gerrit A. Blaauw.

It would be most desirable to provide an incrementor having the speed advantages of the lookahead carry technique while having the simple logic circuitry advantages of the ripple carry technique. By eliminating the carry path as the critical delay path in the incrementor, the number of bits which can be operated on can be increased with little effect on delay.

SUMMARY OF THE INVENTION

Accordingly, it is an object of this invention to provide an improved binary incrementor.

It is another object of this invention to provide an incrementor wherein the carry path is substantially eliminated as the critical delay path.

It is another object of this invention to provide and incrementor wherein the number of bits which can be operated upon may be increased without severely affecting the delay of the incrementor.

It is still a further object of this invention to provide an incrementor which requires the same order of logic circuitry as does a conventional ripple carry design while providing the same order of speed as does the lookahead carry design. These and other objects are accomplished by a "lookback" carry function which implements an actual carry function during the incrementing operation. After the carry function has been implemented at each position of a register, a subsequent determination is made as to whether each carry function was a valid one and thus should have been carried out. With respect to any of the carry functions which were not valid, logic circuitry is provided which eliminates such carries to leave the appropiate carry pattern in each position of the register.

In the preferred embodiment described herinafter, a first address known as the prefetch instruction address, and a second address known as the new instruction address are both generated using the current instruction address as a base. The current instruction address is stored in the instruction address register which outputs 31 bits in parallel in four byte-wide increments. Bits 0 through 26 are common to both the prefetch instruction address and the new instruction address. It is only bits 27 through 30 which are unique to each of the prefetch instruction address and the new instruction address.

Bits 0 through 7 are output to a first two stage incrementor. The first stage of this incrementor generates a carry term while the second stage of this incrementor generates a sum term. Similarly, bits 8–15 and 16–26 are each input to separate tow stage incrementors where the incrementors generate carry and sum terms in the same manner as does the first incrementor. Bits 27–30 are input to both a prefetch incrementor and an instruction address incrementor. In addition, four bits from a first logic block is input to the prefetch incrementor and two bits from a second logic block is input to the instruction address incrementor.

The outputs of each of the first three incrementors are input to a pair of separate multiplexors. Thus, the incremented bits 0–7 are output to a first and a second multiplexor, incremented bits 8–15 are input to a third and a fourth multiplexor, and incremented bits 16–26 are input to a fifth and a sixth multiplexor. Unincremented bits 0–7 are also input to the first and second multiplexor. Unincremented bits 8–15 are input to the third and fourth multiplexor, and unincremented bits 16–26 are input to multiplexors 5 and 6.

Both the prefetch incrementor and the instruction address incrementor have a pair of outputs. The first output is data output which provides the incremented bits 27–30. The second output is a control output which is used to control each of the six multiplexors. The control output signals each of the multiplexors whether the incremented or unincremented bits are the proper ones depending on the output of the prefetch incrementor and the instruction address incrementor.

BEST MODE FOR CARRYING OUT THE INVENTION

Figure 1:
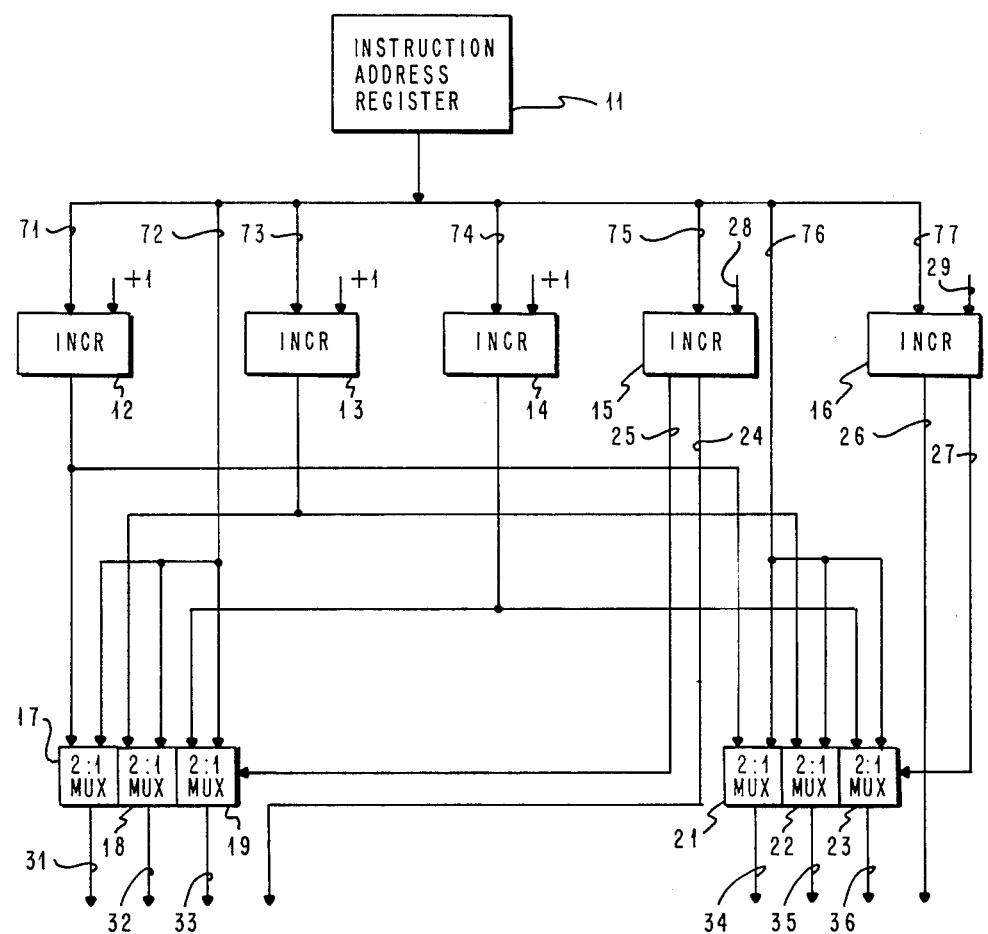
FIG. 1 is a block diagram illustrating the incrementing and multiplexing portions of the invention.

Referring to FIG. 1, there is shown a dual incrementing system for generating a pair of addresses. Each address has 31 bits of binary information in it. Bits 0 through 26 have a common origin, while bits 27 through 30 are unique to each of the generated addresses. Current instruction addresses are stored in 31 bit formats in instruction address register 11. Bits 0 through 7 are output from instructuon address register (IAR) 11 on line 71 to incrementor 12. Bits 8 through 15 are output from IAR 11 to incrementor 13 over line 73. Bits 16 through 26 are output from IAR 11 incremenator 14 over line 74. Bits 0 through 26 are output over line 72 to multiplexors 17, 18, and 19. Bits 0 through 7 are directed to multiplexor 17; bits 8 through 15 are directed to multiplexor 18; and, bits 16 through 26 are directed to multiplexor 19. Similarly, bits 0 through 26 are output over line 76 to multiplexors 21, 22, and 23. Once again, bits 0 through 7 are directed to multiplexor 21; bits 8 through 15 are directed to multiplexor 22; and, bits 16 through 26 are directed to multiplexor 23.

Bits 27 through 30 are output form IAR 11 to prefetch incrementor 15 over line 75 and to instruction address incrementor 16 over line 77. Additionally, 4 bits are input to prefetch incrementor 15 over line 28 and 2 bits are input to instruction address incrementor 16 over line 29. Bits 27 through 30 are output from prefetch incrementor 15 over line 24 after having been incremented by the 4 bits from line 28. Likewise bits 27 through 30 are output from instruction address incrementor 16 over line 26 after having been incremented by the 2 bits from line 29. Bits 0 through 7, 8 through 15, and 16 through 26 are each incremented by 1 bit in incrementors 12, 13, and 14, respectively. Instruction address incrementor 16 and prefetch incrementor 15 each have a control output, lines 27 and 25. Lines 25 and 27 generate a binary 1 output only if the incrementation of bits 27 through 30 generates a carry bit. It is this control bit in conjunction with multiplexors 17 through 19 and 21 through 23 which determine whether the incremented or unicremented bits 0 through 26 are output over lines 31 through 36. The operation of control lines 25 and 27 in conjunction with the multiplexors will be detailed hereinafter.

Figure 2:
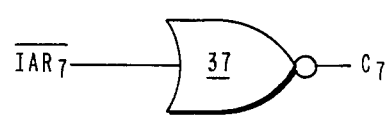
FIG. 2 is a diagram of the logic circuitry used to generate the carry term in the first stage of the incrementor used in the invention.
Figure 2:
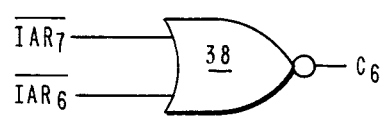
Figure 2:
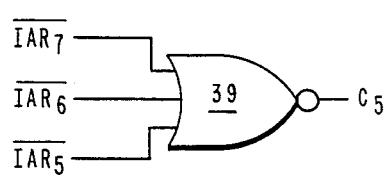
Figure 2:
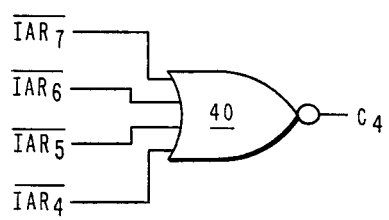
Figure 2:
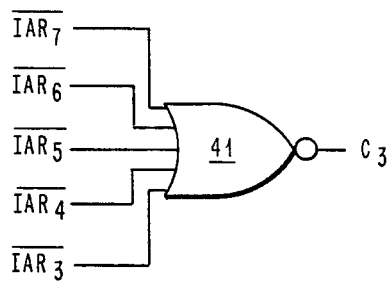
Figure 2:
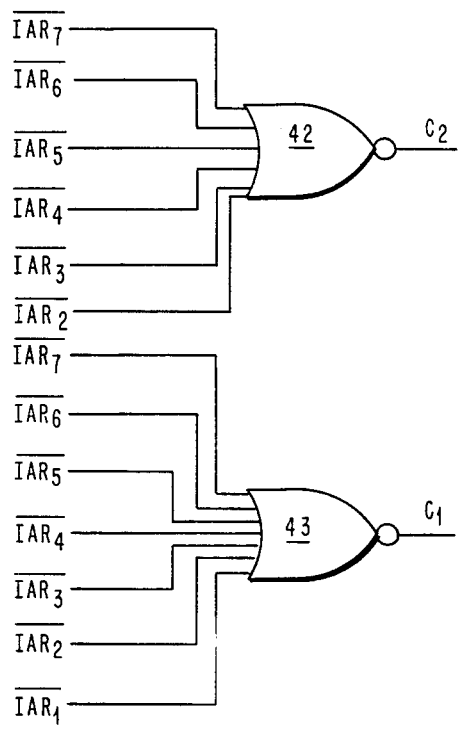
Figure 2:
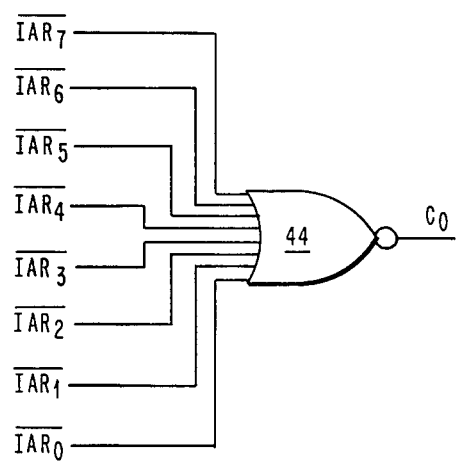
Figure 3:
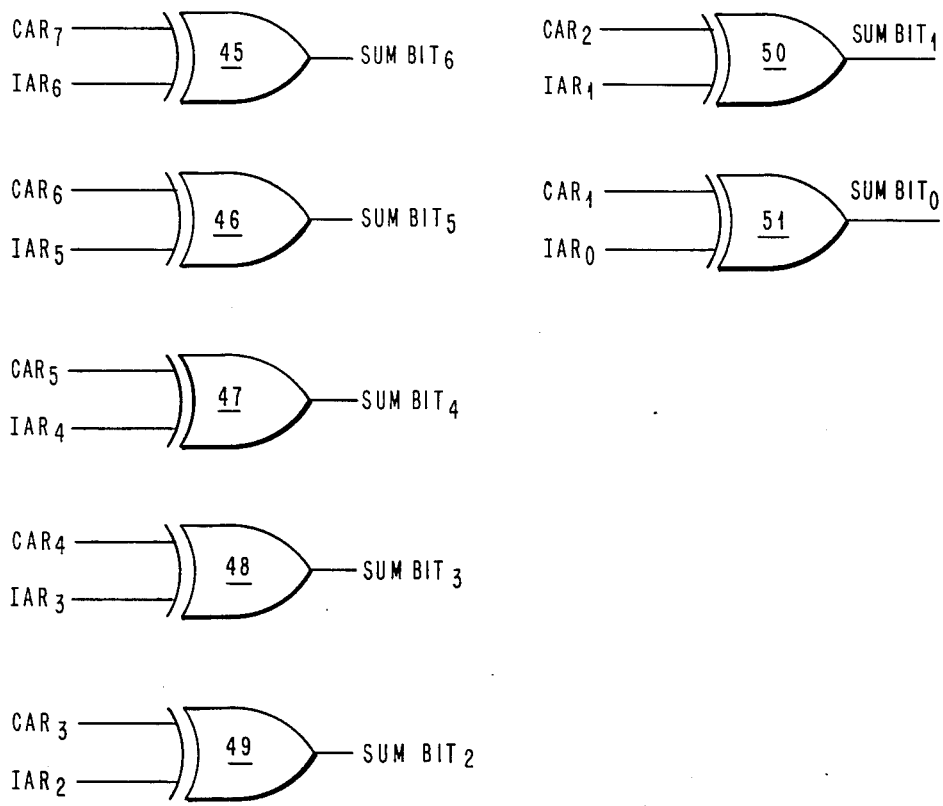
FIG. 3 is a diagram of the logic circuitry used to generate the sum term in the second stage of the incrementor.

The operation of incrementors 12, 13, and 14 will now be presented in more detail with respect to FIGS. 2 and 3. For illustration purposes, the operation of incrementors 12, 13, and 14 will be explained using bits 0 through 7 in incrementor 12. The incrementation of bits 8 through 15 in incrementor 13, and bits 16 through 26 in incrementor 14 will operate in the same manner as the incrementation of bits 0 through 7 in incrementor 12. Consequently, this discussion will be limited to the operation of incrementor 12 although it is applicable to incrementors 13 and 14.

Before proceeding, it is necessary to define the following terms: $G_j$ is a generate term; $P_j$ is a propagate term; $C_j$ is a carry term; $A_j$ is an $IAR_j$ bit; and $B_j$ is either a prefetch bit or an instruction address increment bit. With these basic definitions, the following three equations can be written.

$$G_j = A_j \cdot B_j \tag{1}$$

$$P_j = A_j \oplus B_j \tag{2}$$

$$C_j = G_j + (P_j \cdot C_{j+1}). \tag{3}$$

Since $B_7$ is equal to 0, $$G_7 = IAR_7 \cdot B_7 = IAR_7 \cdot 0 = 0 \tag{4}$$

$$P_7 = (IAR_7 \cdot \overline{0}) + \overline{IAR_7} \cdot 0 = IAR_7 \tag{5}$$

$$C_7 = P_7 \cdot C_8 = IAR_7. \tag{6}$$

The later result is true because $C_8$ is equal to 1.
The carry term can be expressed as $$C_j = P_j \cdot C_{j+1} = IAR_j \cdot IAR_{j+1} \cdot IAR_{j+2} \ldots \cdot IAR_7. \tag{7}$$

Thus, carry terms 0 through 6 may be expressed as $$C_6 = IAR_6 \cdot IAR_7 \tag{8}$$

$$C_5 = IAR_5 \cdot IAR_6 \cdot IAR_7 \tag{9}$$

$$C_4 = IAR_4 \cdot IAR_5 \cdot IAR_6 \cdot IAR_7 \tag{10}$$

$$C_3 = IAR_3 \cdot IAR_4 \cdot IAR_5 \cdot IAR_6 \cdot IAR_7 \tag{11}$$

$$C_2 = IAR_2 \cdot IAR_3 \cdot IAR_4 \cdot IAR_5 \cdot IAR_6 \cdot IAR_7 \tag{12}$$

$$C_1 = IAR_1 \cdot IAR_2 \cdot IAR_3 \cdot IAR_4 \cdot IAR_5 \cdot IAR_6 \cdot IAR_7 \tag{13}$$

$$C_0 = IAR_0 \cdot IAR_1 \cdot IAR_2 \cdot IAR_3 \cdot IAR_4 \cdot IAR_5 \cdot IAR_6 \cdot IAR_7. \tag{14}$$

The implementation of the Equations 6 through 14 are shown in FIG. 2. Each of logic blocks 37 through 44 are NOR gates. The outputs of such NOR gates are carry terms $C_0$ through $C_7$ of incrementor 12. For example, to obtain the carry term, $C_4$, instruction address bits 4 through 7 are input to NOR gate 40. Likewise, to obtain the carry term, $C_2$, instruction address register bits 2 through 7 are input to NOR gate 42.

The second stage of incrementors 12, 13, and 14 is a summing stage. Equation 15 describes the logical operation of this summing stage.

$$SUM_j = P_j \oplus C_{j+1} \tag{15}$$

Using Equation 15, the sum terms for bits 0 through 7 may then be determined. Once again this determination is made assuming that $C_8$ is equal to 1. The sum terms for bits 0 through 7 are shown in Equations 16 through 23.

$$SUM_7 = IAR_7 \oplus C_8 = \overline{IAR_7} \tag{16}$$

$$SUM_6 = IAR_6 \oplus C_7 \tag{17}$$

$$SUM_5 = IAR_5 \oplus C_6 \tag{18}$$

$$SUM_4 = IAR_4 \oplus C_5 \tag{19}$$

$$SUM_3 = IAR_3 \oplus C_4 \tag{20}$$

$$SUM_2 = IAR_2 \oplus C_3 \tag{21}$$

$$SUM_1 = IAR_1 \oplus C_2 \tag{22}$$

$$SUM_0 = IAR_0 \oplus C_1 \tag{23}$$

The implementation of Equations 16 through 23 is shown in FIG. 3. Each of logic blocks 45 through 51 implements an EXCLUSIVE OR logical function. Thus, to generate SUM bit 4, $IAR_4$ and $CAR_5$ are input to EXCLUSIVE OR gate 47. Similarly, to generate SUM bit 0, bit $IAR_0$ and bit $CAR_1$ are input to exclusive OR gate 51. Thus, the outputs of logic blocks 37 through 44 each serve as one of the inputs of logic blocks 45 through 51.

Prefetch incrementor 15 and instruction address incrementor 16 are each designed using Equations 1, 2, 3, and 15. Just like incrementors 12, 13, and 14, prefetch incrementor 15 and instruction address incrementor 16 employ a two stage design. The first stage generates a carry bit and the second stage generates a sum bit. The major difference between these latter two incrementors and the previously described incrementors is in the degree of incrementation. Prefetch incrementor 15 is incremented by 4 bits while instruction address incrementor 16 is incremented by 2 bits. Recall that incrementors 12, 13, and 14 incremented their respective inputted bits by 1 bit only.

In multiplexors 17 through 19 and 21 though 23, a decision is made as to whether the carry function which was implemented in incrementors 12, 13, and 14 was correct or incorrect. If the incrementing function was correct, then the values outputted from such incrementors is chosen as the correct value for bits 0–7, 8–15, and 16–26 of the prefetch address in the new instruction address. If the carry function was incorrect, then bits 0 through 26 used in the prefetch address and the next instruction address are selected from the previous instrucion address without any incrementation.

For example, the value generated by incrementor 12 is pased through multiplexor 17 only if incrementors 13, 14, and 15 generated a positive carryout value. Similarly, the value generated by incrementor 12 is passed through multiplexor 21 only if incrementors 13, 14, and 16 generated a positive carryout value. Equations 24 through 29 describe the control of multiplexors 17 through 19 and 21 through 23.

(24) + ENABLE NEW SUM (16–26) = CAR 27

(25) + ENABLE OLD IAR (16–26) = $\overline{\text{CAR 27}}$

(26) + ENABLE NEW SUM (8–15) = CAR 27·CAR 16

(27) + ENABLE OLD IAR (8–15) = $\overline{\text{CAR 27·CAR 16}}$

(28) + ENABLE NEW SUM (0–7) = CAR 27·CAR 16·CAR8

(29) + ENABLE OLD IAR (0–7) = $\overline{\text{CAR 27·CAR 16·CAR8}}$

Figure 4:
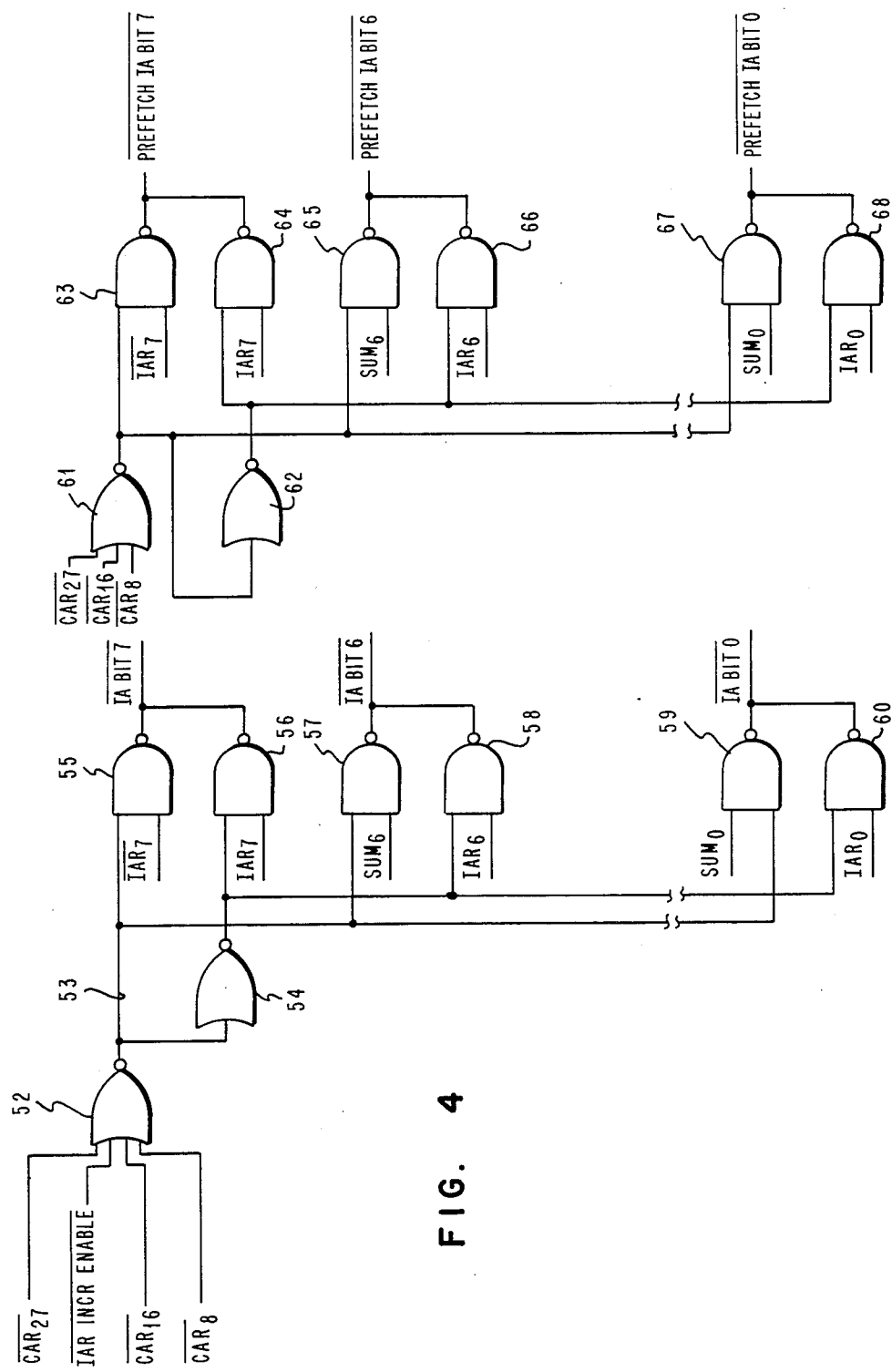
FIG. 4 is a logic diagram of each of the multiplexors according to the present invention.

FIG. 4 shows the implementation of Equations 24 through 29 for instruction address bits 0 through 7. Input IAR INCR ENABLE to NOR gate 52 is a control signal that allows the instruction address (bits 27 through 30) inputted over line 75 to prefetch incrementor 15 and over line 77 to instruction address incrementor 16 to be incremented by 4 or 2 bits respectively. If this line is not enabled, then the instruction address (bits 0 through 27) from IAR 11 is not incremented, but rather the current instruction address is passed through prefetch incrementor 15 and instruction address incrementor 16. Equations 30 through 37 detail the logical operation of multiplexors 21, 22, and 23.

(30) + ENABLE NEW SUM (27–30) = + IAR INCR ENABLE

(31) + ENABLE OLD IAR (27–30) = $\overline{\text{IAR INCR ENABLE}}$

(32) + ENABLE NEW SUM (16–26) = IAR INCR ENABLE ·CAR27

(33) + ENABLE OLD IAR (16–26) = $\overline{\text{IAR INCR ENABLE}}$ ·CAR27

(34) + ENABLE NEW SUM (8–15) = IAR INCR ENABLE ·CAR27·CAR16

(35) + ENABLE OLD IAR (8–15) = $\overline{\text{IAR INCR ENABLE}}$ ·CAR27·CAR16

(36) + ENABLE NEW SUM (0–7) = IAR INCR ENABLE ·CAR27·CAR16·CAR8

(37) + ENABLE OLD IAR (0–7) = $\overline{\text{IAR INCR ENABLE}}$ ·CAR27·CAR16·CAR8

As seen in FIG. 4, NOR gate 52 receives inputs CAR27, IAR INCR ENABLE, CAR16, and CAR8. The output of NOR gate 52 is input over line 53 to NAND gates 55, 57, and 59. The output of NOR gate 52 is also input to invertor 54 which outputs the result to NAND gates 56, 58, and 60. NAND gates 55 and 56 then generate instruction address bit 7. Similarly, NAND gates 57 and 58 generate instruction address bit 6. This continues until NAND gates 59 and 60 generate instruction address bit 0.

The inputs to NOR gate 61 are CAR27, CAR16, and CAR8. The output of NOR gate 61 is then input to NAND gates 63, 65, and 67, and also to invertor 62. The output of invertor 62 is then input to NAND gates 64, 66, and 68. NAND gates 63 and 64 generate prefetch instruction address bit 7, while NAND gates 65 and 66 generate prefetch instruction address bit 6. This logical operation continues through as NAND gates 67 and 68 generate prefetch instruction address bit 0.

It will be readily apparent that the specific logical gates chosen in the embodiment described herein may be varied without departing from the spirit and scope of the invention. Similarly, although addresses were described as being incremented, the techniques disclosed herein may be use to increment any binary numbers whether or not they are addresses.

What is claimed is:

1. A binary incrementor for incrementing a binary number having a plurality of bits separated into most significant groups of bits in ascending order and a least significant group of bits, input, thereto, comprising:
   a first means for separately incrementing each of the most significant groups of bits of the inputted binary number, said first means producing a carry signal for each of said incremented most significant groups if the incrementation thereof results in a carryout;
   a second means for incrementing the least significant group of bits of the inputted binary number, said second means producing a control signal if the incrementation thereof results in a carryout; and
   means having said incremented most significant groups of bits and most significant groups of bits of the inputted binary number as inputs thereto for coupling selective ones of said incremented most significant groups and said most significant groups of the inputted binary number to outputs thereof in response to said carry and control signals generated by said first incrementing and said second incrementing means, said coupling means couples a selected group of the incremented most significant groups of bits subsequent to the production of a carryout in each and every incremented most significant group of bits of descending order and in the incremented least significant group of bits;
   whereby signals appearing on outputs of the coupling means and outputs of the second incrementing means represent the increment of said binary inputted number.

2. A binary incrementor according to claim 1 wherein said first incrementing means comprises:
   means for generating at least one carry bit which is associated with each of the plurality of bits in said most significant groups of bits, and
   means for generating a sum in response to said carry generating means and said plurality of bits in said most significant groups of bits.

3. A method for incremeting a binary number having a plurality of bits separated into most significant groups of bits in ascending order and a least significant group of bits, comprising the steps of:
   incrementing each of the most significant groups of bits of an inputted binary number to produce incremented most significant groups of bits;
   generating a carry signal for each of said incremented most significant groups of bits if the incrementation thereof results in a carryout;
   incrementing the least significant group of bits of said inputted binary number;
   generating a control signal in response to the incrementation of said least significant group of bits resulting in a carryout; and
   coupling selected ones of said incremented most significant groups of bits and said most significant groups of bits in response to the generation of said carry and control signals;
   whereby the selected ones of said incremented most significant groups of bits and said most significant groups of bits and said incremented least significant group of bits represent an increment of said binary number.

4. The method as recited in claim 3 wherein the step of generating the carry signal comprises the step of generating at least one carry bit from plurality of bits in each of said most significant groups of bits.

5. The method as recited in claim 4 further comprises the steps of:
   generating a plurality of sum bits representing said incremented most significant groups of bits from said carry bits and said plurality of bits in each of one said most significant groups of bits; and
   feeding said carry signals, said incremented most significant groups of bits and said most significant groups of bits to inputs of of a multiplexor associated with each of said groups.

6. A dual binary incrementor for generating at least one new address from current address, said address is represented by a binary number having a plurality of bits separated into most significant groups of bits in ascending order and a least significant group of bits, input thereto, comprising:
   a first means for separately incrementing each of the most significant groups of bits of the inputted binary number, said first means for producing a carry signal for each of said incremented most significant groups if the incrementation thereof results in a carryout;
   a second means for incrementing the least significant group of bits of the inputted binary number by a first predetermined number of bits, said second means producing a first control signal if the incrementation thereof results in a carryout;
   a first means having said incremented most significant groups of bits and most significant groups of bits of the inputted binary number as inputs thereto for coupling selective ones of said incremented most significant groups and said most significant groups of the inputted binary number to outputs thereof in response to said carry and said first control signals generated by said first incrementing and said second incrementing means, said first coupling means couples a selected group of the incremented most significant groups of bits subsequent to the production of a carryout in each and every incremented most significant group of bits descending order and the production of a carryout by the second incrementing means;
   a third means for incrementing the least significant group of bits of the inputted binary number by a second predetermined number of bits, said third means producing a second control signal if the incrementation thereof results in a carryout;
   a second means having said incremented most significant groups of bits and most significant groups of bits of the inputted binary number as inputs thereto for coupling selective ones of said incremented most significant groups and said most significant groups of the inputted binary number to outputs thereof in response to said carry and said second control signals generated by said first incrementing and said third incrementing means, said second coupling means couples a selected group of the incremented most significant group of bits subsequent to the production of a carryout in each and every incremented most significant group of bits of descending order and the production of a carryout by the third incrementing means; and whereby signals appearing on outputs of said first coupling means and outputs of the second incrementing means represent a prefetch instruction address and whereby the signals appearing on outputs of said coupling means and outputs of the third incrementing means represent a new instruction address.

* * * * *

UNITED STATES PATENT AND TRADEMARK OFFICE
CERTIFICATE OF CORRECTION

PATENT NO. : 4,685,078
DATED : August 4, 1987
INVENTOR(S) : Abraham Torres

It is certified that error appears in the above—identified patent and that said Letters Patent is hereby corrected as shown below:

Column 7, line 14   "input," should read --input--.
Column 8, line 10   before "plurality" insert --a--.
Column 8, line 16   "each of" should read --each one--.
Column 8, line 17   "one" should read --of--.
Column 8, line 23   before "current" insert --a--.
Column 8, line 51   before "descending" insert --of--.

Signed and Sealed this

Twelfth Day of July, 1988

Attest:

DONALD J. QUIGG

*Attesting Officer*    *Commissioner of Patents and Trademarks*